(12) United States Patent
Hanan

(10) Patent No.: US 6,898,730 B1
(45) Date of Patent: May 24, 2005

(54) SYSTEM AND METHOD FOR FAIL-OVER SWITCHING IN A DISK STORAGE MEDIUM

(75) Inventor: Thomas D. Hanan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 473 days.

(21) Appl. No.: 09/996,686

(22) Filed: Nov. 30, 2001

(51) Int. Cl.$^7$ ................................................ G06F 11/00
(52) U.S. Cl. ............................................ 714/7; 714/43
(58) Field of Search .................................. 714/7, 5, 43

(56) References Cited

U.S. PATENT DOCUMENTS

| | | | | |
|---|---|---|---|---|
| 4,608,559 A | * | 8/1986 | Friedman et al. | 340/825.5 |
| 5,781,448 A | * | 7/1998 | Nakamura et al. | 700/293 |
| 5,922,077 A | | 7/1999 | Espy et al. | |
| 6,009,535 A | | 12/1999 | Halligan et al. | |
| 6,097,769 A | * | 8/2000 | Sayiner et al. | 375/341 |
| 6,571,355 B1 | * | 5/2003 | Linnell | 714/9 |
| 6,658,504 B1 | * | 12/2003 | Lieber et al. | 710/52 |
| 6,725,394 B1 | * | 4/2004 | Bolt | 714/7 |
| 2003/0045175 A1 | * | 3/2003 | Lynch et al. | 439/680 |

OTHER PUBLICATIONS

Enterprise Storage Staff. 'Serial Attached SCSI Working Group Formed'. Nov. 26, 2001. www.internetnews.com/storage/article.php/928251.*

* cited by examiner

*Primary Examiner*—Robert Beausoliel
*Assistant Examiner*—Yolanda L Wilson
(74) *Attorney, Agent, or Firm*—Milad G. Shara, Esq.; Burns, Doane, Swecker & Mathis LLP

(57) ABSTRACT

A disk drive is disclosed that is configured to be accessible in fail-over via buses associated with plural host interfaces. In accordance with exemplary embodiments of the present invention, the disk drive comprises a disk storage medium, a first bus connection, and a second bus connection. The disk drive comprises a switch for selectively connecting the disk storage medium to at least one of the first and second bus connections. The disk drive also comprises an interface controller for detecting whether at least one of the first and second bus connections is active and for controlling the switch in response.

16 Claims, 5 Drawing Sheets

SYSTEM AND METHOD FOR FAIL-OVER SWITCHING IN A DISK STORAGE MEDIUM

BACKGROUND

1. Field of the Invention

The present invention relates generally to disk drives. More particularly, the present invention relates to a system and method for fail-over switching in a disk storage medium.

2. Background Information

Standard communication between a host computer, such as PC-based computer, and a hard disk drive is conventionally performed using a disk drive host interface. The hard disk drive can be, for example, an Integrated Drive Electronics/Advanced Technology Attachment (IDE/ATA)-compliant hard drive, a SCSI-compliant hard drive, a fiber channel device (e.g., one or more hard drives used with associated fiber channel switches in a multi-disk environment), or any other type of hard disk drive or storage systems.

Many disk drive systems rely upon standardized buses to connect the disk drive host interface to the disk drive. Generally speaking, the computer's operating system accesses a hard disk drive as an input/output (I/O) device connected to a bus, such as the IDE/ATA, SCSI or fiber channel bus. To communicate between the host computer and the hard disk drive via a standard bus, information is transferred to and from the hard disk drive via the disk drive host interface using a standard disk drive host interface protocol. Such an information transfer vests control with the operating system, and the hard disk drive serves as a slave to the host computer. Command signals are supplied by the host computer to the hard disk drive via the disk drive host interface, such that the host computer controls read and write operations for transferring data from or to the hard disk drive.

Failures at the disk drive or at the disk drive host interface can result in the disk drive system going offline. The resulting loss of connection can affect system throughput performance and user application performance.

Fail-over is a backup operation that automatically and transparently switches to a standby connection if a primary host or connection fails and redirects requests from the failed or downed system to the backup system. For example, SCSI and fiber channel buses support a feature that allows them to be accessed by redundant host systems. This feature protects them from losing access to a group of disk drives as a result of a single failure. The fail-over feature is handled by the host computer, i.e., is host-driven.

U.S. Pat. No. 5,922,077, which is hereby incorporated by reference in its entirety, discloses a fail-over switching system. The switching system includes a fail-over switch in a data storage system having multiple storage device controllers separately communicating over redundant fiber channel loops such that if a fiber channel loop becomes disabled, the affected data storage device controller may reroute its communications by sharing the alternate fiber channel loop.

The SCSI and fiber channel host-driven dual-initiator model involves using multiple storage device controllers for each disk drive to maintain plural, independent, continuously-active channels. A SCSI, host-driven, dual-initiator model for performing fail-over is disclosed in U.S. Pat. No. 6,009,535, which is hereby incorporated by reference in its entirety.

It would be desirable to provide a disk drive fail-over protocol using redundant host connections.

SUMMARY OF THE INVENTION

A disk drive is disclosed that is configured to be accessible in fail-over via buses associated with plural host interfaces. In accordance with exemplary embodiments of the present invention, the disk drive comprises a disk storage medium, a first bus connection, and a second bus connection. The disk drive comprises a switch for selectively connecting the disk storage medium to at least one of the first and second bus connections. The disk drive also comprises an interface controller for detecting whether at least one of the first and second bus connections is active and for controlling the switch in response.

The present invention is also directed to a method for implementing a fail-over feature for a disk drive having an interface controller and having access to plural host interfaces. In accordance with exemplary embodiments of the present invention, the interface controller is configured to execute the steps of determining when a first one of the plural host interfaces is in a failed state and initiating a selection of a second host interface in response to the step of determining.

Exemplary embodiments are applicable to all disk drive technologies, including, but not limited to, IDE, ATA, and serial ATA (SATA), and serial attached SCSI (SAS). Such applicability will enhance the appeal of IDE, SATA and SAS solutions in the higher-margin enterprise storage market.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1A:
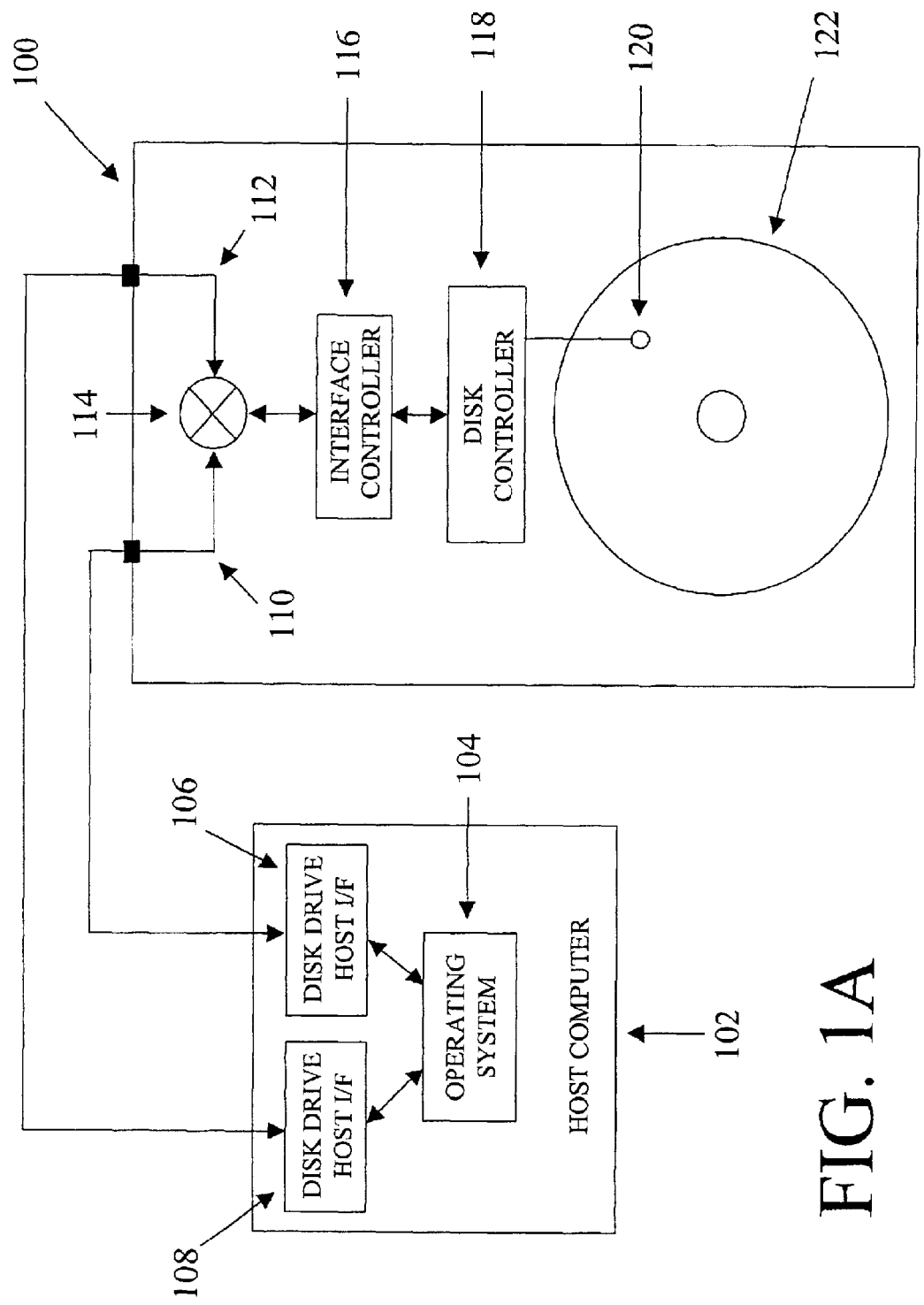
FIG. 1A is a block diagram of a system having a disk drive that is configured to be accessible in fail-over via buses associated with plural host interfaces, wherein the switch and first and second bus connections are internal to the disk drive, in accordance with an exemplary embodiment of the present invention.

FIG. 1A is a block diagram of a system having a disk drive 100 that is configured to be accessible in fail-over via buses associated with plural host interfaces, in accordance with an exemplary embodiment of the present invention. Disk drive 100 is compatible with at least one operating system 104, residing on at least one host computer 102, that is capable of accessing disk drives. Disk drive 100 is also compatible with at least one disk drive host interface 106 and 108. The host computer operating system 104 can be any operating system, such as, for example, Microsoft Windows™, Linux™, MacOS™, Solaris™, or any other computer operating system that is capable of accessing disk drives. The disk drive host interfaces 106 and 108 can be any host interfaces, such as, for example, an Integrated Drive Electronics/Advanced Technology Attachment (IDE/ATA) interface, a SCSI interface, a fiber channel interface, an Ethernet interface, an InfiniBand™ interface, a Peripheral Component Interconnect (PCI) interface, or any other host interface that can be used for accessing a hard disk drive.

A disk storage medium 122 of disk drive 100 can be accessed using a head assembly 120. Disk drive 100 can include a microprocessor-based disk controller 118 for controlling head assembly 120 for reading from and writing to disk storage medium 122 using head assembly 120. A hard disk controller is integrated circuit hardware and associated circuitry that are responsible for controlling the hard disk drive. Disk controller 118 can be any part or all of the printed circuit board assembly (PCBA) of the hard disk controller of disk drive 100. Hard disk controllers are known in the art and described, for example, in U.S. Pat. No. 5,909,334, the disclosure of which is hereby incorporated by reference.

According to exemplary embodiments of the present invention, disk drive 100 includes a disk storage medium, such as, for example, disk storage medium 122. Disk drive 100 also includes a first bus connection 110 and a second bus connection 112. First bus connection 110 can be connected to disk drive host interface 106 of host computer 102. Second bus connection 112 can be connected to disk drive host interface 108 of host computer 102. According to exemplary embodiments, the first and second bus connections are serial advanced technology attachment (SATA) bus connections. According to an alternate exemplary embodiment, the first and second bus connections are serial attached SCSI (SAS) bus connections. According to an alternate exemplary embodiment, the first and second bus connections are Ethernet connections. However, the first and second bus connections can be any type of bus connection that can be used to transport information between disk drive 100 and host computer 102.

Disk drive 100 includes a switch for selectively connecting the disk storage medium to at least one of the first and second bus connections. As shown in FIG. 1A, switch 114 is connected to first bus connection 110 and second bus connection 112. However, switch 114 can be connected to any number of buses. According to exemplary embodiments, switch 114 includes a multiplexer. The multiplexer is used by switch 114 to selectively connect to either first bus connection 110 or second bus connection 112. According to exemplary embodiments, the multiplexer is an analog device. According to an alternate exemplary embodiment, the multiplexer is a digital device. According to another alternate exemplary embodiment, the multiplexer is an optical device. Switch 114 can be any type of analog, digital, or optical multiplexer or any other type of device that can be used to selectively connect disk storage medium 122 to one of several sources.

Disk drive 100 includes an interface controller for detecting whether at least one of the first and second bus connections is active and for controlling the switch in response.

Interface controller 116 is connected to switch 114 to control switch 114. Interface controller 116 is also connected to disk controller 118. Interface controller 116 can act as a conduit for data that is passed between disk controller 116 and switch 114. Alternatively, interface controller 116 can control switch 114 without having the data pass through it between disk controller 118 and switch 114. Interface controller 116 can be computer hardware or firmware that resides externally to disk controller 118. Alternatively, interface controller 116 can reside internally to disk controller 118 as, for example, hardware that forms a part of the computer circuitry of disk controller 118 or as software that resides in any form of computer memory resident internally to disk controller 118. In addition, switch 114 can be located either internally to or externally from interface controller 116.

According to exemplary embodiments, the first and second bus connections are separate initiator ports of the disk drive. The initiator ports are instantiated by the interface controller in response to detecting which of the first and second bus connections is active. Initially, disk drive 100 is connected to, for example, first bus connection 110. Interface controller 116 initially instructs switch 114 to selectively connect to first bus connection 110. However, disk drive 100 can be initially connected to any bus connection. Interface controller 114 then monitors first bus connection 110 to determine whether the bus connection is active.

To detect which of the bus connections is active, interface controller can use, for example, a predetermined timeout to determine if no activity has been detected on a particular bus connection for longer than a certain time interval. For example, a heartbeat message can be transmitted by disk drive host interface 106 over first bus connection 110 to interface controller 116 while disk drive host interface 106 is selectively connected to disk drive 100. However, the timeout can use any form of message or command that indicates that a bus connection is active. So long as interface controller 116 receives the heartbeat message from disk drive host interface 106 over first bus connection 110 (i.e., a timeout does not occur), disk drive 100 will remain selectively connected to first bus connection 110.

However, if the heartbeat message from disk drive host interface 106 has ceased or otherwise stopped, then a timeout will occur. In response, interface controller 116 can send an interrupt or any other form of "ping" message or command to disk drive host interface 108 over first bus connection 112 to determine if second bus connection 110 is active. If interface controller 116 does not receive a response from disk drive host interface 108 within a certain timeout period, first bus connection 112 can be considered to be inactive as well. Otherwise, interface controller 116 can control switch 114 to selectively connect to second bus connection 112.

Upon selectively connecting to second bus connection 112, disk drive 100 can instantiate the bus connection with disk drive host interface 108 using the disk drive host interface protocol-specific initialization. Since disk drive host interface 108 will now "see" a disk drive (i.e., disk drive 100) that it did not detect previously, the disk drive host interfaces require the ability to establish, during their operation, a connection with a disk drive to which it they were not previously connected. If the disk drive host interfaces do not support such a "hot-plugging" capability, the disk drive host interfaces can be modified by adding either hardware or software that allows the disk drive host interfaces to instantiate a connection during their operation, even after start-up, with a disk drive that suddenly comes online (from the perspective of the subsequent, selectively-connected bus connection).

According to exemplary embodiments, a plurality of disk drives 100 can be connected to host computer 102. Each of the plurality of disk drives 100 can be connected to either first bus connection 110 or second bus connection 112. For example, all disk drives 100 can be connected to the same bus connection at the same time. For example, all the disk drives 100 can be connected to first bus connection 110. According to exemplary embodiments, all of the disk drives 100 can communicate with each other using, for example, interface controller 116. The disk drives 100 can communicate with each other over first bus connection 110 or any other bus or internal connection in host computer 102. In the event that one of the disk drives 100 detects a failure on first bus connection 106, the disk drive 100 that detected the failure can notify all of the other disk drives 100 to selectively connect to second bus connection 112. Alternatively, each disk drive 100 can detect the failure independently and selectively connect to second bus connection 112 without communicating that information to any of the other disk drives 100.

Figure 1B:
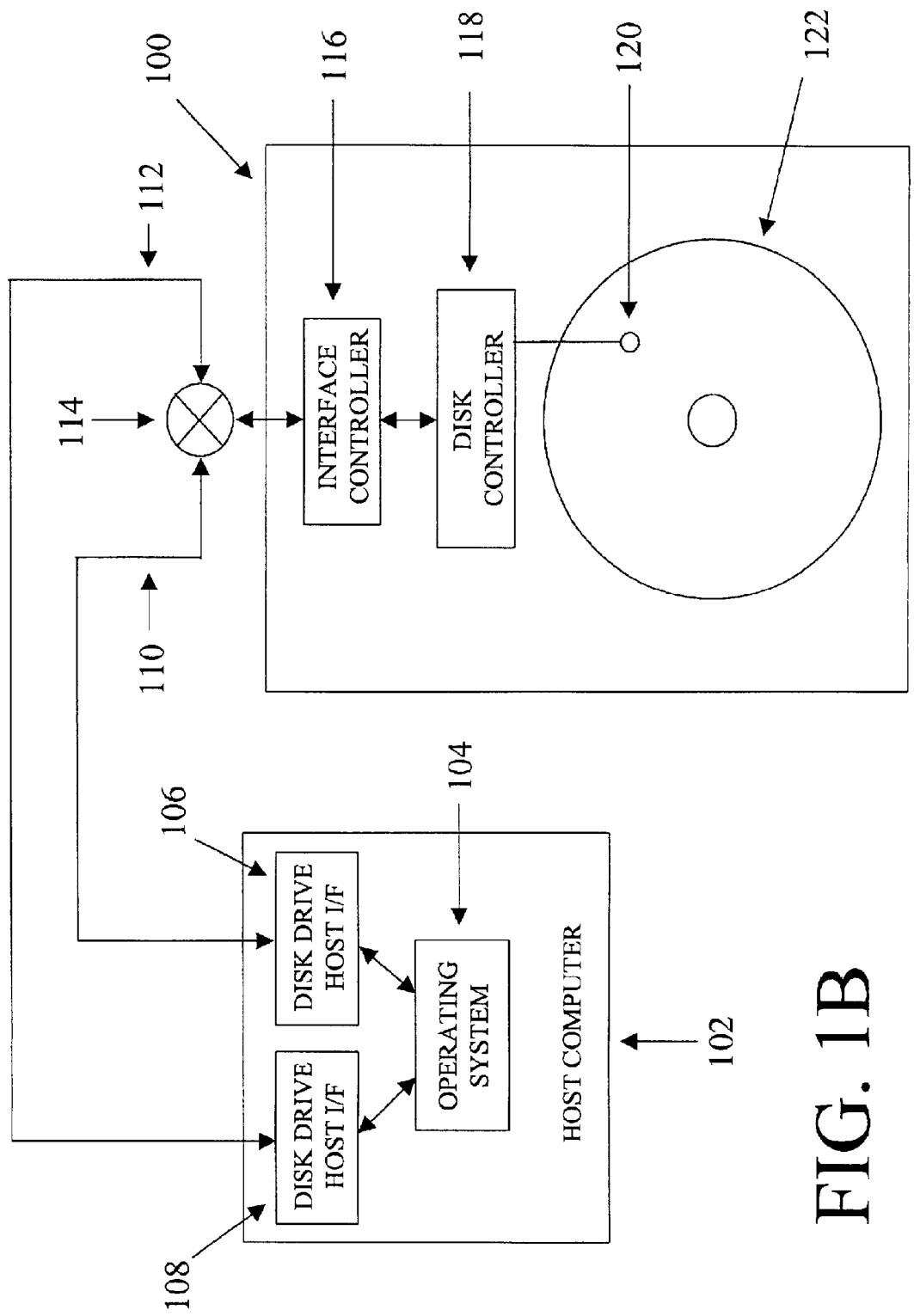
FIG. 1B is a block diagram of a system having a disk drive that is configured to be accessible in fail-over via buses associated with plural host interfaces, wherein the switch and first and second bus connections are external to the disk drive, in accordance with an alternate exemplary embodiment of the present invention.

According to exemplary embodiments, the first and second bus connections and the multiplexer are internal to the disk drive. Thus, as shown in FIG. 1A, first bus connection 10, second bus connection 112, and switch 114 are located internally to disk drive 100 (e.g., resident on a disk drive VLSI controller chip). For example, disk controller 118 can be configured as a disk drive VLSI controller chip. First bus connection 110, second bus connection 112, and switch 114 can be configured to reside on the disk drive VLSI controller chip. According to an alternate exemplary embodiment, the first and second bus connections and the multiplexer are external to the disk drive. Thus, as shown in FIG. 1B, first bus connection 110, second bus connection 112, and switch 114 are located externally from disk drive 100. In such an alternate exemplary embodiment, the external switch 114 can be connected to disk drive 100 through interface controller 116.

Figure 2:
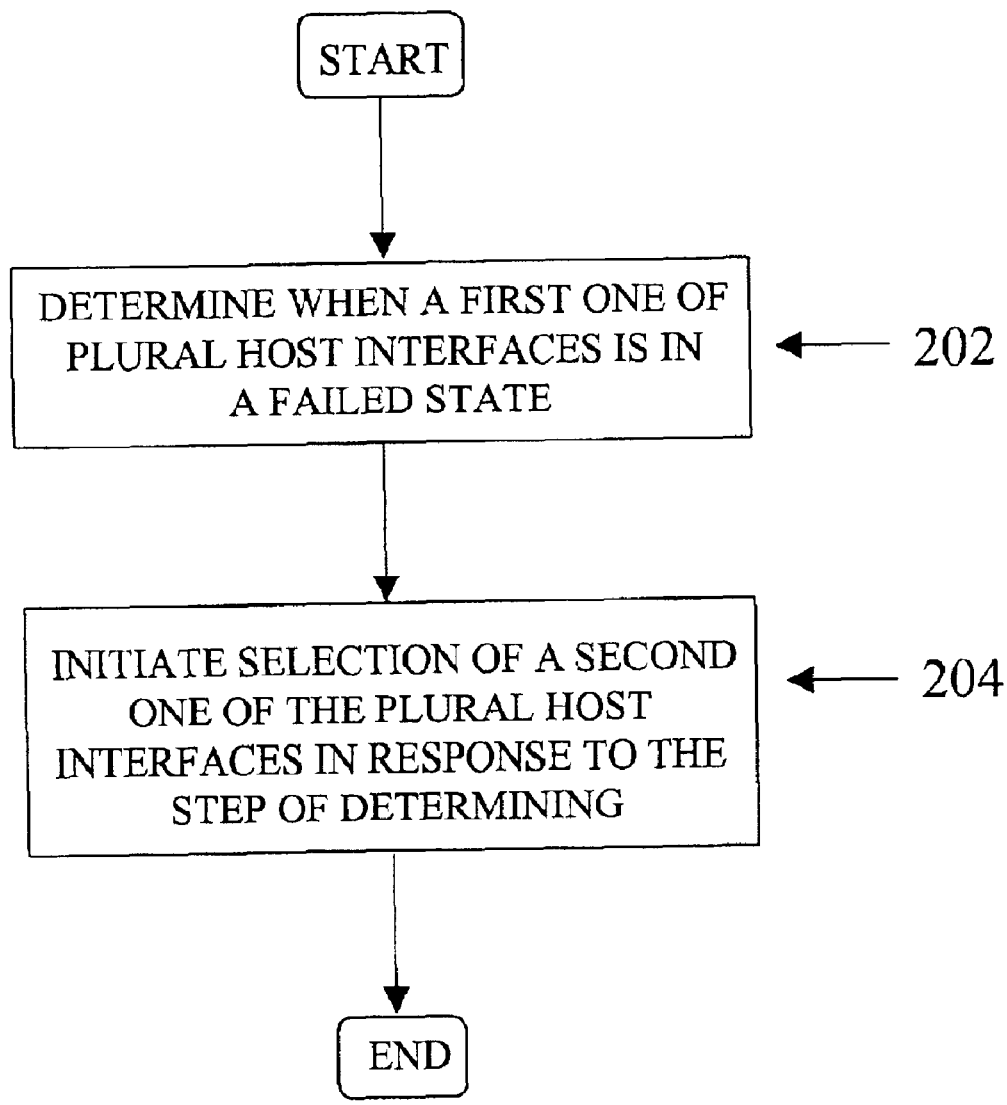
FIG. 2 is a flowchart illustrating the steps carried out for implementing a fail-over feature for a disk drive having an interface controller and having access to plural host interfaces, in accordance with an exemplary embodiment of the present invention.

FIG. 2 is a flowchart illustrating the steps carried out for implementing a fail-over feature for a disk drive having an interface controller and having access to plural host interfaces, in accordance with an exemplary embodiment of the present invention. In step 202, a determination is made as to when a first one of the plural host interfaces is in a failed state. According to exemplary embodiments, the first and second bus connections are serial advanced technology attachment (SATA) bus connections. According to an alternate exemplary embodiment, the first and second bus connections are Ethernet connections. However, the first and second bus connections can be any type of bus connection that can be used to transport information between a disk drive and the disk drive host interfaces of a host computer.

Figure 3:
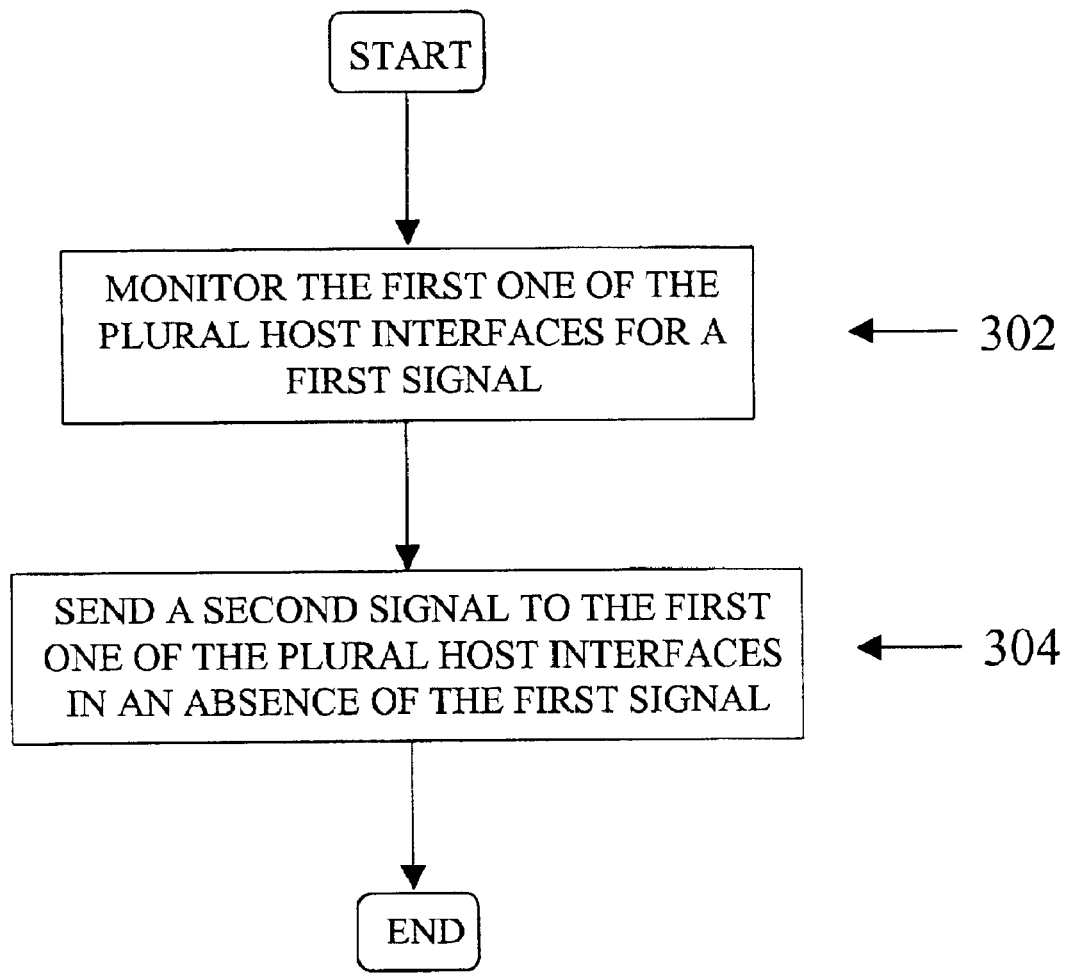
FIG. 3 is a flowchart illustrating the steps carried out for determining when a first one of plural host interfaces is in a failed state, in accordance with an exemplary embodiment of the present invention.

FIG. 3 is a flowchart illustrating the steps carried out for determining when a first one of plural host interfaces is in a failed state, in accordance with an exemplary embodiment of the present invention. In step 302, the first one of the plural host interfaces is monitored for a first signal. According to exemplary embodiments, the first signal is produced at regular time intervals determined by the first one of the plural host interfaces. For example, the first signal can be a heartbeat message or any other form of timeout mechanism. Thus, interface controller 116 can monitor first bus connection 110 for a heartbeat message from disk drive host interface 106. So long as the heartbeat message is received by interface controller 116 at regular time intervals (i.e., a timeout does not occur), first bus connection 110 can be considered active.

If a timeout does occur, in step 304, a second signal is sent to a second one of the plural host interfaces in the absence of the first signal. According to exemplary embodiments, the second signal is a disk-rive-initiated interrupt signal. For example, interface controller 116 can send an interrupt or any other form of message or command to host interface 108 to determine if second bus connection 110 is still active. If interface controller 116 does not receive a response in a certain period of time (i.e., a timeout occurs), second bus connection 110 can be considered inactive. Otherwise, switch 114 can selectively connect to second bus connection 112.

Figure 4:
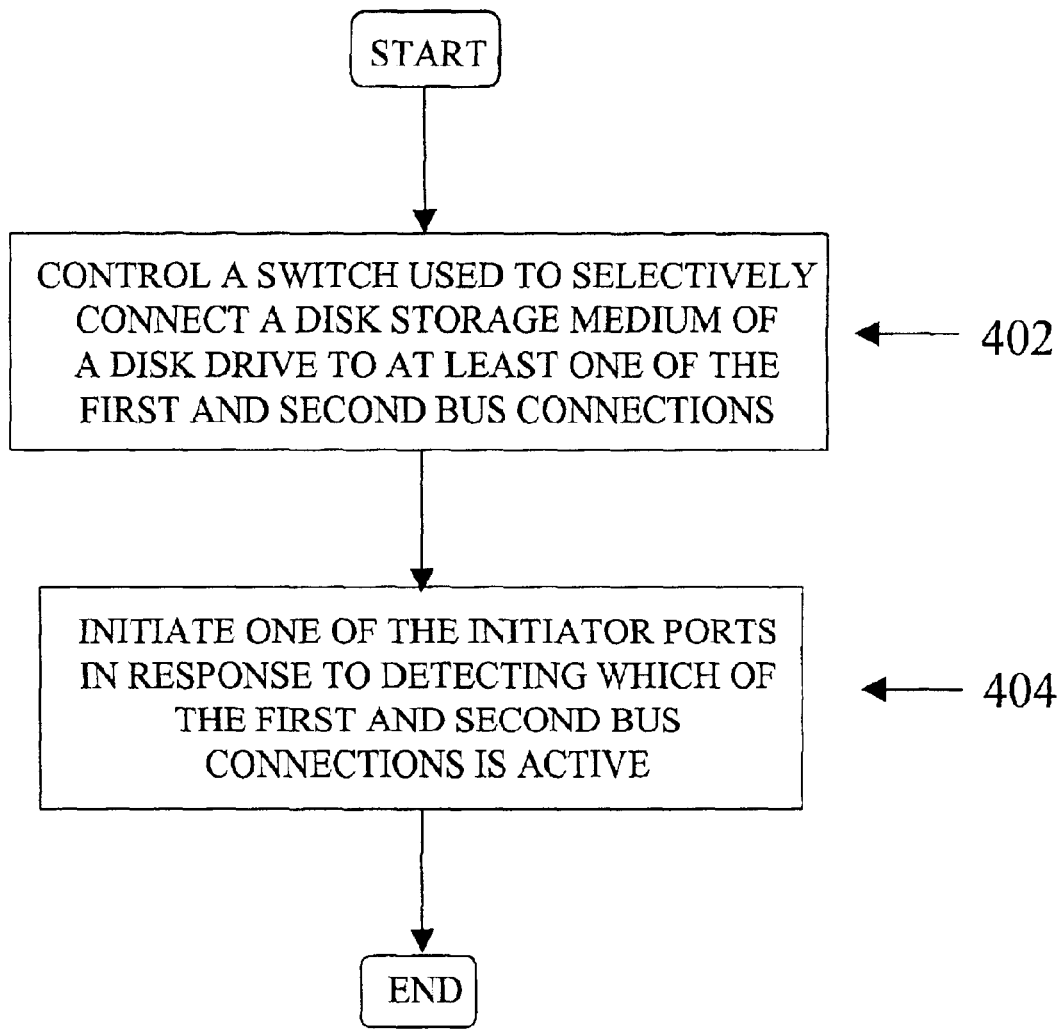
FIG. 4 is a flowchart illustrating the steps carried out for initiating a selection of a second host interface, in accordance with an exemplary embodiment of the present invention.

In step 204 of FIG. 2, a selection of a second one of the plural host interfaces is initiated in response to the step of determining. Thus, if first bus connection 110 is determined to be inactive, interface controller 116 can control switch 114 to selectively connect to disk drive host interface 112. FIG. 4 is a flowchart illustrating the steps carried out for initiating a selection of a second host interface, in accordance with an exemplary embodiment of the present invention.

In step 402, a switch is controlled to selectively connect a disk storage medium of the disk drive to at least one of the first and second bus connections during the step of initiating. The disk drive accesses the plural host interfaces using the first and second bus connections. However, the switch can be connected to any number of bus connections and, hence, the disk drive can have access to any number of plural host interfaces. According to exemplary embodiments, if a timeout occurs on first bus connection 110, interface controller 116 can control switch 114 to selectively connect disk storage medium 122 to second bus connection 112 in the event that such a failure of first bus connection 110 occurs. In step 404, one of the initiator ports is instantiated in response to detecting which of the first and second bus connections is active. Consequently, once switch 114 selectively connects to second bus connection 112, second bus connection 112 is instantiated between disk drive 100 and disk drive host interface 108.

Disk drive 100 can instantiate the connection with disk drive host interface 108 using the disk drive host interface protocol-specific initialization. Since disk drive host interface 108 will now "see" a disk drive (i.e., disk drive 100) that it did not see previously, the disk drive host interfaces require the ability to establish, during their operation, a connection with a disk drive to which it they were not previously connected. If the disk drive host interfaces do not support such a "hot-plugging" capability, the disk drive host interfaces can be modified by adding either hardware or software that allows the disk drive host interfaces to instantiate a connection during their operation, even after start-up, with a disk drive that suddenly comes online (from the perspective of the subsequent bus connection).

In the event that second bus connection 112 fails, those of ordinary skill in the art will recognize that a similar process can be performed to selectively connect disk drive 100 to first bus connection 10, or any other bus to which disk drive 100 can be connected.

What is claimed is:

1. A disk drive configured to be accessible in fail-over via buses associated with plural host interfaces, the disk drive comprising:

a disk storage medium;

a first bus connection;

a second bus connection;

a switch for selectively connecting the disk storage medium to at least one of the first and second bus connections; and an interface controller for detecting whether at least one of the first and second bus connections is active and for controlling the switch in response, wherein the switch includes a multiplexer and the first and second bus connections and the multiplexer are integral to the disk drive.

2. A disk drive according to claim 1, wherein the first and second bus connections are separate initiator ports of the disk drive, the initiator ports being instantiated by the interface controller in response to detecting which of the first and second bus connections is active.

3. A disk drive according to claim 1, wherein the first and second bus connections and the multiplexer are external to the disk drive.

4. A disk drive according to claim 1, wherein the multiplexer is an analog device.

5. A disk drive according to claim 1, wherein the multiplexer is a digital device.

6. A disk drive according to claim 1 wherein the multiplexer is an optical device.

7. A disk drive according to claim 1, wherein the first and second bus connections and the multiplexer are integral to a disk drive VLSI controller chip.

8. A disk drive according to claim 1, wherein the first and second bus connections are serial advanced technology attachment (SATA) bus connections.

9. A disk drive according to claim 1, wherein the first and second bus connections are serial attached SCSI (SAS) bus connections.

10. A disk drive according to claim 1, wherein the first and second bus connections are Ethernet connections.

11. A method for implementing a fail-over feature for a disk drive having an interface controller and having access to plural host interfaces, wherein first and second bus connections are separate initiator ports of the disk drive, the interface controller being configured to execute the steps of:

determining when a first one of the plural host interfaces is in a failed state, the determining comprising:
monitoring the first one of the plural host interfaces for a first signal; and
sending a second signal to a second one of the plural host interfaces in an absence of the first signal;

initiating a selection of a second one of the plural host interfaces in response to the step of determining; and controlling a switch used to selectively connect a disk storage medium of the disk drive to at least one of the first and second bus connections during the step of initiating.

12. A method according to claim 11, comprising:

instantiating one of the initiator ports in response to detecting which of the first and second bus connections is active.

13. A method according to claim 11, wherein the first and second bus connections are serial advanced technology attachment (SATA) bus connections.

14. A method according to claim 11, wherein the first and second bus connections are Ethernet connections.

15. A method according to claim 11, wherein the first signal is produced at regular time intervals determined by the first one of the plural host interfaces.

16. A method according to claim 11, wherein the second signal is a disk-drive-initiated interrupt signal.

* * * * *